United States Patent [19]

Bachman

[11] 4,124,164

[45] Nov. 7, 1978

[54] TAMPER PROOF SAFETY CUT-OFF FLUID NOZZLE

[75] Inventor: Robert C. Bachman, Lancaster, Pa.

[73] Assignee: Armstrong Cork Company, Lancaster, Pa.

[21] Appl. No.: 814,130

[22] Filed: Jul. 8, 1977

[51] Int. Cl.² ............................................. B05B 1/30
[52] U.S. Cl. ............................... 239/533.15; 239/572; 239/574; 239/DIG. 22
[58] Field of Search ............... 137/461, 517; 239/291, 239/570, 571, 572, 574, DIG. 22, 533.1, 533.15

[56] References Cited

U.S. PATENT DOCUMENTS

| | | | |
|---|---|---|---|
| 542,024 | 7/1895 | McIlhenny | 137/461 |
| 3,106,937 | 10/1963 | Sands | 239/572 X |
| 3,612,406 | 10/1971 | Bass, Jr. | 239/571 |
| 4,010,770 | 3/1977 | Peters | 137/517 X |

Primary Examiner—John J. Love

[57] ABSTRACT

A fluid nozzle designed to shut off when the pressure of the fluid exiting the nozzle reaches a predetermined value, e.g., 30 psi, as set forth in OSHA regulations. The nozzle has a body having an inlet, an outlet, a passage therebetween, and a conventional valve for manually opening and closing the passage between the inlet and outlet. An apertured closure is inserted in the outlet and has a valve seat on its inner surface. A valve having a face on its one end and a passageway through the valve is positioned in the passage to slideably move between the valve seat of the apertured closure and a valve stop. A vent hole through the wall of the body is located between the conventional opening and closing valve and the valve stop. A spring biases the valve against the valve stop in an open position against the flow of fluid through the passage until the pressure exerted by the fluid flowing through the passage overcomes the force exerted by the biasing spring and moves the valve with the flow of fluid so that the valve face and seat make contact and close the apertured closure of the nozzle.

12 Claims, 4 Drawing Figures

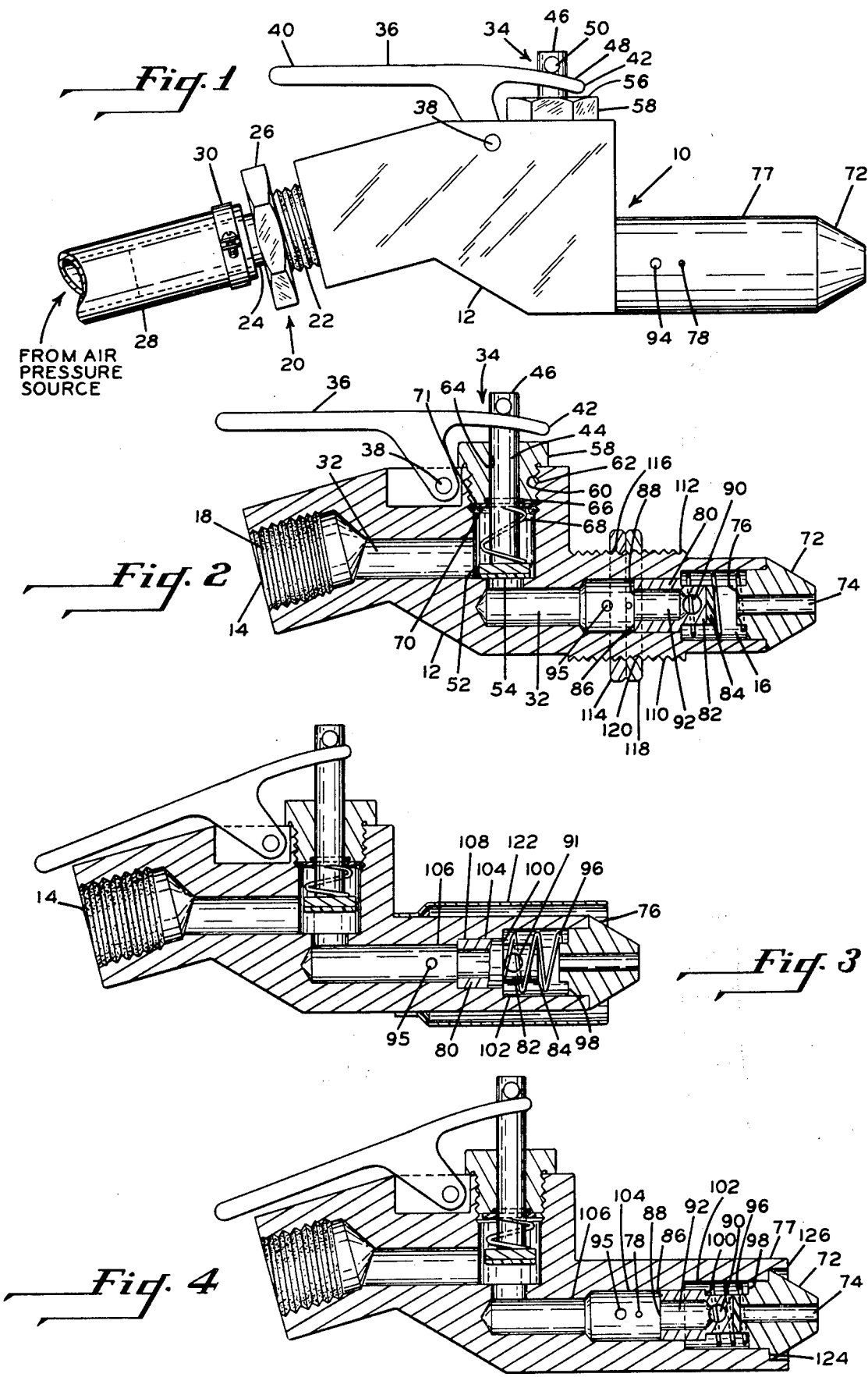

TAMPER PROOF SAFETY CUT-OFF FLUID NOZZLE

BACKGROUND OF THE INVENTION

1. Field of the Invention

This invention is primarily directed to a fluid nozzle, and more particularly, to a tamper proof fluid nozzle incorporating a safety cut-off feature so that the nozzle becomes inoperative when the pressure of the fluid exiting the nozzle reaches a predetermined value.

2. Description of the Prior Art

U.S. Pat. No. 3,367,662 teaches a pressure shock absorber for gas-type welding systems wherein the gas pressure is extremely high. The self-equalizing shock absorbing valve of the shock absorber is normally biased open so that gas can flow thereby. Upon a surge of high pressure, the valve closes but automatically returns to open position after gas has bled through the valve from the high pressure side to the low pressure side. The valve is designed so that a restrictive passage is used to bleed fluid through the valve when the valve is closed. Also, the pressure shock absorber is designed to be removable. If it were desired to defeat the purpose of the pressure shock absorber, the shock absorber could be removed, thereby further allowing the shock absorbing valve to be removed which would defeat the function of the shock absorber.

The fluid nozzle described herein is designed to close and shut off the fluid exiting from the nozzle and remain in this closed and inoperative position until the fluid pressure exerted against the valve is reduced. The valve of the invention herein will not automatically reopen. The nozzle is designed to work at much lower pressures than the above-described pressure shock absorber and further the cut-off valve of the nozzle is designed so that the fluid basically passes through the valve rather than around the valve. Also, the nozzle of this invention is designed to be tamper proof in the cut-off valve cannot be removed from the nozzle after the nozzle has been assembled thereby overcoming the possibility that the safety cut-off feature of the nozzle may be defeated.

U.S. Pat. No. 2,245,271 teaches a safety cut-off valve designed to be inserted in a fluid pressure conduit between the source of supply and the end where used. Although the valve member in the safety cut-off valve is normally spring biased in an open position so that gas can pass through the valve, the valve is designed to close when there is a drop in pressure at the exit end of the valve. Once the safety cut-off valve has closed and become inoperative, several steps must be taken to restore the valve to an operative condition. These steps are turning off the pressure from the pressure source and venting the pressure source side of the valve by slightly unscrewing the coupling of the valve so that the biasing spring may overcome the pressure against the valve member and thereby restore the valve member to its original operational position. Also, the valve is made so that it can be disassembled which would allow the valve member to be removed if it were desired to defeat the purpose of the safety cut-off valve.

The nozzle of the invention described herein is designed to cut-off the fluid exiting from the nozzle when there is an increase in fluid pressure against the cut-off valve. When the cut-off valve closes the nozzle, thereby making it inoperative, there is no need to turn off the pressure from the fluid pressure source and vent the pressure source side of the nozzle by any unscrewing of the coupling of the valve. The nozzle will become operative again and allow fluid to pass therethrough merely by unplugging the vent holes, the plugging of which caused the increase in pressure and the inoperative condition in the first place, to reduce the pressure acting against the cut-off valve. As mentioned before, the nozzle is designed to be tamper proof so that the nozzle cannot be disassembled and the cut-off valve removed thereby overcoming the safety cut-off feature of the valve.

U.S. Pat. No. 2,929,399 teaches a fluid check valve to be used in a fluid pressure line between a pressure source and the end where the pressure is used. A ball is used as the valve member and is spring biased against the fluid which flows thereby. A drop in pressure on the use or exit side of the valve causes the valve member to close a port. The valve is designed to automatically leak air around the port so that, if pressure is again built up on the exit side of the valve, the spring will automatically return the ball to the operational position it was in before there was a decrease in pressure on the exit side of the valve. Again, the valve is made to be disassembled thereby allowing the ball valve member to be removed from the valve if it were desired to defeat the action of the check valve.

In the nozzle described herein, the cut-off valve reacts to an increase in pressure on the inlet side of the nozzle to force the valve to close the nozzle. Also, once the nozzle of this invention shuts off and becomes inoperative, it will remain so until the pressure exerted against the cut-off valve is decreased. It will not automatically return to its pre-cut-off position. Finally, the nozzle is assembled so that the cut-off valve cannot be removed from the interior of the nozzle to defeat the safety cut-off feature of the nozzle.

SUMMARY OF THE INVENTION

A fluid nozzle being tamper proof and having a safety cut-off has a body which has a fluid inlet, a fluid outlet, and a fluid passage between the inlet and outlet. A conventional valve operated manually to open and close the passage is located between the fluid inlet and the fluid outlet. An apertured closure having a valve seat on its inner surface is inserted into the fluid outlet of the body. A projectio from the wall of the body extends into the passage and is located between the conventional valve for manually opening and closing the passage and the apertured closure. A safety cut-off valve is positioned in the passage to slideably move between the valve seat on the inner surface of the apertured closure and the projection in the passage. The cut-off valve has a face at its one end, the face being adapted to cooperate with the seat to close the aperture in the closure. The cut-off valve also has a passageway through the valve, the passageway having an inlet port on the end of the cut-off valve opposite the face end of the valve and an outlet port on a wall of the cut-off valve adjacent the face end. Practically all fluid passing through the nozzle which does not exit through a fluid vent hole in the wall of the body passes through the passageway of the cut-off valve as it travels through the nozzle before exiting the nozzle through the apertured closure. The fluid vent hole connects the passage to the exterior of the body and is positioned between the conventional valve for manually opening and closing the passage and the projection in the passage. The vent hole is used to change the pressure that the fluid exerts against the cut-off valve in the passage. A spring biases the cut-off valve against the projection in the passage in an open position against the flow of fluid through the passage. When the pressure exerted on the cut-off valve by the fluid flowing through the passage overcomes the force exerted by the biasing spring, the cut-off valve moves with the flow of fluid so that the cut-off valve face contacts the valve seat on the apertured closure and closes the aperture thereof, thereby shutting off the nozzle.

OSHA regulations require that the pressure of air exiting from a utility air line used for cleaning not exceed 30 psi. Normal utility pneumatic line pressures are around 95 psi. Presently, there are several safety nozzles which can be used on the ends of the conventional utility pneumatic lines to reduce the pressure from the line pressure to an exit pressure of around 30 psi. This reduction of pressure in these safety nozzles is basically achieved by having vent holes in the barrel of the nozzle, between the inlet and outlet of the nozzle. However, various ways have been devised for circumventing the safety pressure reduction feature of these safety nozzles, e.g., taping the vent holes shut, unscrewing the barrel of the nozzle from the main body of the nozzle and inserting a sleeve in the interior of the nozzle to cover the vent holes, and generally using some means to plug the vent holes shut. By plugging the vent holes of these safety nozzles, the exit pressure of the air from the nozzle is no longer reduced to the required 30 psi but is the same as the air line pressure, whatever it may be.

An object of this invention is to create an air nozzle for use on a conventional utility pneumatic line which reduces the air line pressure to no more than 30 psi in compliance with OSHA regulations. Another object of this invention is to design an air nozzle which not only acts as a safety nozzle in compliance with OSHA regulations, i.e., a nozzle which will not deliver an exit pressure of more than 30 psi, but which is also essentially tamper proof so that it cannot be altered to exceed a 30 psi nozzle exit pressure.

BRIEF DESCRIPTION OF THE DRAWING

FIG. 1 is a side view of the tamper proof, safety cut-off fluid nozzle of this invention with the conventional manual opening and closing valve shown in its closed position and with an accompanying conventional coupling shown for attaching a conventional pneumatic line to the inlet end of the nozzle.

FIG. 2 is a sectional view of the nozzle of FIG. 1 with a device for adjusting the cross-sectional area of the opening of the vent hole on the exterior of the body additionally shown and with the safety cut-off valve shown in its open position.

FIG. 3 is a sectional view of the nozzle of FIG. 1 with a shroud around the barrel of the nozzle additionally shown, with an alternate safety cut-off valve travel-limiting device shown, with the safety cut-off valve shown only partially broken away, with the safety cut-off valve biasing spring shown in elevation, with the conventional manual opening and closing valve shown in its open position, and with the safety cut-off valve shown in its open position.

FIG. 4 is a sectional view of the nozzle of FIG. 1 with an alternate nozzle barrel design shown, with the conventional manual opening and closing valve shown in its open position, and with the safety cut-off valve shown in its closed position.

DESCRIPTION OF THE PREFERRED EMBODIMENT

The tamper proof, safety cut-off fluid nozzle 10 has a one piece body 12 of brass or some other appropriate metal. The body 12 has an air inlet 14 at its one end and an air outlet 16 as its opposite end. The air inlet 14 has been internally threaded with screw threads 18.

A conventional nipple 20 of brass or other appropriate material has external screw threads 22 on its one end and a nonthreaded tube 24 on its other end. There is a hexagonal nut 26 near the longitudinal center of and integral with nipple 20. Nipple 20 is screwed into the air inlet 14 of body 12 until the nipple fits tightly into the inlet, with the external threads 22 of nipple 20 mating with the internal threads 18 of body 12. A hose 28 of rubber, neoprene, or other suitable material which can be used as a conduit for air is inserted over the tubular end 24 of nipple 20. A conventional clamp 30 is used to fasten the air hose 28 onto the tube 24 of nipple 20. As can be seen in FIG. 1, the hose 28 leads to the nozzle 10 from an air pressure source. More particularly, this pressure source in the case of air could be a conventional air compressor, not shown in the drawing of FIG. 1. Although fluid nozzle 10 is being described wherein the fluid being used is air, this is not meant to limit the nozzle to the use of air only. It is felt that nozzle 10 can be used equally well with any other fluid, be it liquid or gaseous.

Air passage 32 goes between and connects air inlet 14 with air outlet 16 of body 12. Near the mid-point of passage 32 between air inlet 14 and air outlet 16 there is a conventional, manually operated valve 34 for opening and closing passage 32. The conventional opening and closing valve 34 has a handle 36 of metal or other suitable material pivoted on a pin 38 which is fastened to the body 12 in any conventional manner. The end 40 of handle 36 is the end that is manipulated by the operator of nozzle 10. The opposite end of handle 36, end 42, is moveably attached to valve stem 44 at its upper end 46 in any conventional manner. As illustrated in the drawings, the upper surface 48 of end 42 is in moveable contact with the underside of pin 50 which is fastened to the upper end 46 of valve stem 44.

The lower end 52 of conventional valve stem 44 has a conventional valve stem seal 54 of neoprene or other conventional gasketing material. A valve stem plug 56 has a hexagonal nut 58 on its one end and external screw threads 60 on its other end. External screw threads 60 mate with internal screw threads 62 which have been tapped into the top of body 12 when the plug is screwed into the body. The plug 56 has a bore 64 through its center. The bore 64 is slightly larger than the outside diameter of the conventional valve stem 44 to accommodate the sliding reciprocation of the valve stem in the bore.

A conventional valve stem plug seal 66, e.g., a neoprene o-ring, is positioned around the valve stem 44 and in a recess in the surface 71 of the threaded end of the valve stem plug 56 to seal the opening between the valve stem and the bore of the plug and thereby prevent air from escaping therethrough. A conventional washer 70 of metal or other appropriate material is positioned around the valve stem 44 and against both surface 71 and valve stem plug seal 66. A conventional coil spring 68 is positioned between the lower end 52 of the valve stem 44 and the washer 70 which protects the valve stem plug seal 66 from being damaged by the coil spring 68. The coaction of the coil spring 68 and the washer 70 retains the valve stem plug seal 66 in the recess in surface 71. The spring normally biases the valve stem so that the valve stem seal 54 closes the passage between the inlet 14 and the outlet 16. The valve stem 44 is shown in its closed position in FIG. 1. The valve stem of FIG. 1 is also in its closed position as indicated by the position of handle 36.

A closure plug 72 having an aperture 74 therethrough is force-fitted into air outlet 16. The shape of the closure 72 extending beyond the outlet end 16 of the nozzle has the shape of a smooth surfaced truncated cone. Although this shape of apertured closure functions to prevent its removal from the outlet 16 after it has been inserted therein, other shapes could be designed which would also function to prevent their removal once inserted in outlet 16 and which would still come within the scope of the invention herein. Inner surface 76 of the closure 72 functions as a valve seat.

A hole is drilled through the barrel 77 of the body 12 of the nozzle and is located between the conventional manual opening and closing valve 34 and the closure 72. A pin 78 of steel or other appropriate metal or material is inserted in this hole and fastened therein with a force fit. The pin 78 extends from the one side of the barrel to the opposite side of the barrel and passes through the passage 32 of the body. This pin serves as a means for limiting the travel of a safety cut-off valve 80 which is positioned in the passage to slideably move between the pin 78 and the valve seat 76 of closure 72.

The cut-off valve 80 is in the general shape of a cylinder. End 82 of valve 80 has a face 84 of neoprene or other suitable gasketing material which is adapted to cooperate with seat 76 of the closure 72 to close the aperture 74 when the face 84 and seat 76 are in contact. End 86 of valve 80 has an inlet port 88 therein. An outlet port 90 is in the wall of the cylinder adjacent end 82 thereof. There is a second outlet port 91 in the wall of the cylinder. This second port 91 is the same size as outlet port 90 and is located on the opposite side of the cylinder from outlet port 90. Additional outlet ports having different sizes and shapes could be put into the wall of the valve 80 adjacent end 82 and still come within the purview of this invention. A passageway 92 connects the inlet port 88 to outlet ports 90 and 91.

An air vent hole 94 connects the passage 32 to the exterior of body 12. There is a companion air vent hole 95 on the opposite side of the body which also connects the passage 32 to the exterior of the body 12. Although these two air holes are on opposite sides of the body and have the same diameter, it is not necessary that the size of the holes be the same, that the shape of the holes be circular, or that there is only two holes, since all such variations would come within the scope of this invention.

Coil spring 96 is positioned in passage 32 between the inner surface 98 of closure 72 and lip 100 on the outer wall of valve 80. Spring 96 biases cut-off valve 80 in an open position against the pin 78. The cut-off valve 80 being biased in its open position is shown in both FIG. 2, where the opening and closing valve 34 is in its closed position and therefore no air is passing through the passage 32 of the nozzle, and in FIG. 3, where the opening and closing valve 34 is shown in its open position, which allows air to pass through passage 32 of the nozzle. The bore 102 of the passage 32 at the air outlet 16 is larger than the bore 104 of passage 32. The bore 104 is the bore which guides the cut-off valve 80 in its reciprocating movement between the pin 78 and the valve seat 76 of closure 72.

An alternative to using pin 78 as the means for limiting the travel of the valve 80 away from the closure 72 is to have the bore 106 of passage 32 smaller than the bore 104 of passage 32 and to have the bore 106 terminate in a ridge 108 around the entire internal circumference of passage 32 at the point where the pin 78 would normally be used in the passage 32. This alternative is shown in FIG. 3. This ridge 108 then serves as the cut-off valve travel limiting means in the direction away from closure 72. Other cut-off valve travel limiting means may be used and one would still not depart from the invention herein.

A way of adjusting the cross-sectional area of the opening of the air vent holes 94 and 94 so that one nozzle can be used with a range of supply line air pressures is to have at least the exterior surface 110 of barrel 77 at the air vent holes 94 and 95 threaded with threads 112 to receive a nut 114 with internal threads 116 which mate with the threads 112 and a nut 118 with internal threads 120 which also mate with threads 112. Nut 114 is screwed onto the barrel 77 until the size of the cross-sectional area of the opening of vent holes 94 and 95 is altered to whatever size is desired. Nut 118 is then screwed onto threads 112 and tightened against nut 114 therefore locking nut 114 in its desired position. An alternative means of adjusting the cross-sectional area of the opening of the air vent holes 94 and 95 would be to use a single self-locking nut in place of the two nuts 114 and 118. As shown in FIG. 2, the nuts are on the right side of the vent hole 95. These nuts could just as easily be positioned on the left side of vent hole 95 in FIG. 2 to change the cross-sectional area of the opening from left to right.

In FIG. 3, a shroud 122 is placed around the exterior of the barrel 77 of body 12. The shroud 122 is positioned on the barrel 77 so that the openings of the air vent holes 94 and 95 are within the shroud. The shroud is used to direct air exiting from passage 32, through openings of air vent holes 94 and 95 to the exterior of body 12, to the air outlet end of the nozzle. The shroud would prevent the air or any other gas or any liquid exiting from the vent openings from being a hindrance or bother to the operator of the nozzle. Additionally, the air directed by the shroud to the outlet end of the nozzle would give the operator an additional volume of air to accomplish whatever job is being done. If it were desired, the vent hole opening adjusting means, a single self-locking nut or two nuts, and the shroud could be used together by having the nut or nuts on the left side of the air vent holes 94 and 95 and having the shroud fastened to the right side of the not or, if two nuts were used, to the right side of the right nut.

As shown in FIG. 4, the outlet end of the nozzle can be varied in design. By having the barrel 77 extend beyond the edge 124 of closure 72, for any desired length, it would be much more difficult to remove the closure 72 from the outlet 16 of the nozzle. Since the only known way to defeat the safety cut-off feature of this nozzle would be to remove the closure 72 from the air outlet end of the nozzle and then remove the safety cut-off valve 80 from passage 32, extending the end 126 of barrel 77 to some desired length beyond the edge 124 of the closure 72 makes it more difficult, if not practically impossible, to remove the closure once it has been inserted into the air outlet 16 of the nozzle.

A specific operational example of the nozzle of the invention has the following parameters: bore 104 — 0.4375 inch diameter; bore 102 — 0.531 inch diameter; safety cut-off valve 80 outside diameter at inlet port 88 end — 0.436 inch; safety cut-off valve 80 outside diameter at end 82 — 0.365 inch; length of the portion of safety cut-off valve 80 having an outside diameter of 0.436 inch - ⅜ inch; length of the portion of safety cut-off valve 80 having an outside diameter of 0.365 inch - ¼ inch; thickness of the neoprene valve face 84 on the end 82 of safety cut-off valve 80 — 1/16 inch; overall length of safety cut-off valve 80 including the neoprene valve face 84 — 11/16 inch; inlet port 88 and passageway 92 of safety cut-off valve 80 — 174 inch diameter; outlet ports 90 and 91 of safety cut-off valve 80 — 0.144 inch diameter (#27 drill); aperture 74 of closure 72 — 0.177 inch diameter (#16 drill); coil spring 96: wire diameter — 0.028 inch, outside diameter — 7/16 inch, free length — ⅝ inch, and five coils; pin 78 — 3/32 inch diameter; air vent holes 94 and 95 — 0.136 inch diameter (#29 drill).

This just described nozzle will operate with a supply line air pressure coming into the inlet 14 of nozzle 10 of slightly less than 10 psi to slightly more than 80 psi. Within this inlet pressure range, this nozzle will function to deliver a range of nozzle exit pressures of up to no more than 30 psi as required by OSHA regulations. By varying the parameters of this nozzle, and particularly the size and/or number of the vent holes, one can produce a tamper proof, safety cut-off nozzle which will operate within OSHA regulations over a large range of supply line air pressures. For example, if it were desired to use a supply line air pressure of 100 psi with this nozzle and not have the nozzle become inoperative every time the nozzle is turned on, which is what would happen if the above parameters were used, the size of the vent holes 94 and 95 must be enlarged and/or the number of vent holes must be increased.

In operation, air from a supply line at conventional pressures enters the inlet 14 of the nozzle and passes through passage 32 to valve 34. When the valve 34 is closed as is shown in FIGS. 1 and 2, no air proceeds through the remainder of passage 32, and the safety cut-off valve 80 is biased by coil spring 96 to its open position as shown in FIG. 2. When an operator depresses handle 36 or valve 34, this opens valve 34 and allows air to continue through passage 32. Some air exits the nozzle through the air vent holes 94 and 95, and most of the remainder of the air passes through inlet port 88, passageway 92, and outlet ports 90 and 91 of safety cut-off valve 80 into passage 32 having an enlarged bore 102 and then exits the nozzle through aperture 74 of closure 72. A very slight amount of air passes between the outside of cut-off valve 80 and the bore 104 of passage 32. So long as the pressure exerted against the cut-off valve is less than the force of the coil spring 96 biasing the cut-off valve against the flow of air through the valve, the air is able to exit the nozzle through aperture 74 and the nozzle remains operational as is shown in FIG. 3. If the operator tries to increase the exit pressure of the air exiting the nozzle through aperture 74 by some way plugging the vent holes 94 and 94, the pressure exerted against the cut-off valve is greater than the force exerted by the coil spring biasing the valve against the flow of air through the valve and the valve face 84 comes in contact with the valve seat 76 and closes the aperture 74, thereby making the valve inoperable as shown in FIG. 4. Even though an operator may wish to have a greater exit pressure from the nozzle than the 30 psi allowed by OSHA regulations, the nozzle of this invention will not allow this to occur since the safety cut-off valve automatically closes the nozzle and makes the nozzle inoperative if there is over 30 psi trying to exit from the nozzle. As soon as the plugged or blocked air vent holes are unplugged or unblocked, the tamper proof, safety cut-off nozzle of this invention again becomes operative and is again capable of supplying an exit air pressure which will not exceed OSHA regulations.

What is claimed is:

1. A tamper proof, safety cut-off, fluid nozzle comprising:
   (a) a body having a fluid inlet, a fluid outlet, and a fluid passage therebetween,
   (b) a means for manually opening and closing said passage between said inlet and said outlet,
   (c) an apertured closing means attached to said outlet of said body,
   (d) a valve seat on the inner surface of the apertured closing means,
   (e) a valve travel limiting means in said passage between said manual opening and closing means and said apertured closing means,
   (f) a valve positioned in said passage to slideably move between said valve seat and said valve travel limiting means,
   (g) said valve having a face at one end and a passageway through said valve,
   (h) said face adapted to cooperate with said seat to close the apertured closing means,
   (i) a fluid vent hole through the wall of said body, said vent hole connecting said passage to the exterior of said body and positioned between said manual opening and closing means and said valve travel limiting means to change the pressure of the fluid against the valve in said passage, and
   (j) a means for biasing said valve against said valve travel limiting means in an open position against the flow of fluid through said passage until the pressure exerted by the fluid flowing through said passage overcomes the force exerted by said biasing means and moves said valve with the flow of fluid so that said valve face and seat contact one another and close the apertured closing means of said nozzle.

2. The tamper proof, safety cut-off, fluid nozzle of claim 1 wherein said passageway has an inlet port on the end of the valve opposite the face end and an outlet port on a wall of the valve adjacent the face end.

3. The tamper proof, safety cut-off, fluid nozzle of claim 1 wherein a portion of said passage between said valve travel limiting means and said apertured closing means has a cross sectional area larger than the cross sectional area of the remaining portion of said passage therebetween.

4. The tamper proof, safety cut-off, fluid nozzle of claim 1 wherein the biasing means comprises a coil spring seated at one end against the apertured closing means and seated at the other end against the valve.

5. The tamper proof, safety cut-off, fluid nozzle of claim 1 wherein said valve travel limiting means comprises a protrusion in said passage.

6. The tamper proof, safety cut-off, fluid nozzle of claim 5 wherein said protrusion comprises a pin fastened to said body.

7. The tamper proof, safety cut-off, fluid nozzle of claim 5 wherein said protrusion is an integral part of said body.

8. The tamper proof, safety cut-off, fluid nozzle of claim 1 wherein the apertured closing means comprises an apertured plug inserted into the fluid outlet of said body.

9. The tamper proof, safety cut-off, fluid nozzle of claim 8 wherein a portion of the apertured plug extends beyond the fluid outlet of said body and said portion has the shape of a smooth surfaced, truncated cone.

10. The tamper proof, safety cut-off, fluid nozzle of claim 1 wherein the body further comprises a means to adjust the cross sectional area of the opening of said vent hole on the exterior of said body to vary the amount of fluid which can be vented from the passage to the exterior of said body and, thereby, change the pressure of the fluid in said passage.

11. The tamper proof, safety cut-off, fluid nozzle of claim 10 wherein the means of adjusting the cross sectional area of the opening of said vent hole comprises screw threads on the exterior of said body at said vent hole and a nut adapted to be screwed onto the body screw threads so that the nut can be screwed across the opening of said vent hole and, thereby, alter the cross sectional area of the opening of said vent hole.

12. The tamper proof, safety cut-off, fluid nozzle of claim 1 wherein the body further comprises a shroud over the opening of said vent hole on the exterior of said body to direct the fluid exiting through the opening of said vent hole toward the fluid outlet end of said body.

* * * * *